United States Patent
Kim et al.

(10) Patent No.: US 7,216,355 B2
(45) Date of Patent: May 8, 2007

(54) DISK-CHUCKING APPARATUS FOR DISK DRIVES

(75) Inventors: Jae Kyung Kim, Kyungki-do (KR); Byoung Soo Lee, Kyungki-do (KR); Chi Sung Lee, Kyungki-do (KR); Jun Kun Choi, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 381 days.

(21) Appl. No.: 10/967,126

(22) Filed: Oct. 19, 2004

(65) Prior Publication Data

US 2006/0031866 A1    Feb. 9, 2006

(30) Foreign Application Priority Data

Aug. 5, 2004    (KR) .................. 10-2004-0061642

(51) Int. Cl.
*G11B 17/02* (2006.01)
(52) U.S. Cl. .................................................. 720/706
(58) Field of Classification Search ............... 720/706, 720/709
See application file for complete search history.

(56) References Cited

U.S. PATENT DOCUMENTS

| | | | | |
|---|---|---|---|---|
| 4,881,745 | A | * | 11/1989 | Peters ....................... 279/2.09 |
| 5,583,717 | A | * | 12/1996 | Nakata et al. ............ 360/99.06 |
| 6,072,767 | A | * | 6/2000 | Iwazawa .................... 720/706 |
| 6,799,324 | B1 | * | 9/2004 | Takagi et al. .............. 720/712 |

FOREIGN PATENT DOCUMENTS

| | | |
|---|---|---|
| JP | 13-157859 | 7/1991 |
| JP | 05-342732 | 12/1993 |
| JP | 8-195010 | 7/1996 |
| JP | 10-199128 | 7/1998 |
| JP | 2001-297509 | 10/2001 |
| JP | 2003-123355 | 4/2003 |
| JP | 2003-303460 | 10/2003 |
| JP | 2004-199830 | 7/2004 |
| KR | 1998-29136 | 8/1998 |
| KR | 2004-49917 | 6/2004 |

OTHER PUBLICATIONS

Japanese Patent Office, Office Action, mailed Sep. 12, 2006.

* cited by examiner

*Primary Examiner*—Angel Castro
(74) *Attorney, Agent, or Firm*—Lowe Hauptman Berner, LLP.

(57) ABSTRACT

The disk-chucking apparatus comprises a chuck base having a fitting hole formed through the center thereof for allowing a driving shaft of the motor, and a plurality of first and second disposition parts formed at the outer surface. A plurality of chuck pins are disposed in the first disposition parts of the chuck base such that the chuck pins can be moved inward and outward, respectively. The chuck pins are resiliently supported outward by means of spring members each having one end connected to the chuck base. A plurality of resilient pieces are provided at the second disposition parts, respectively. Each of the resilient pieces comprises a curved part, formed between a horizontal resilient part and a vertical resilient part, having first and second inner curved sections such that outer surfaces of the resilient pieces resiliently contact the inner circumference of the center hole of the disk.

6 Claims, 7 Drawing Sheets

DISK-CHUCKING APPARATUS FOR DISK DRIVES

RELATED APPLICATION

The present application is based on, and claims priority from, Korean Application Number 2004-61642, filed Aug. 5, 2004, the disclosure of which is hereby incorporated by reference herein in its entirety.

BACKGROUND OF THE INVENTION

1. Field of the Invention

The present invention relates to a disk-chucking apparatus for disk drives, and more particularly to a disk-chucking apparatus for disk drives wherein the distance from the center of a disk to the rotational center of a driving shaft is minimized, and the assembly of a motor and a chuck base is easily and rapidly carried out without using a bonding agent.

2. Description of the Related Art

Generally, a disk drive comprises: a deck base forming a main body of the disk drive; means for loading/unloading a disk to/from the deck base; means for rotating the disk loaded to the deck base by means of the loading/unloading means at a predetermined speed; and means for reading/writing information from/to a recording surface of the disk while the reading/writing means moves in the radial direction of the disk rotated by the rotating means. The disk may be loaded or unloaded while being placed on a tray. Also, the disk may be introduced into or withdrawn from the inside of the deck base while being received in a caddy or a cartridge.

A spindle motor is usually used as the disk rotating means, and a pick-up unit is usually used as the reading/writing means.

The disk drive as described above further comprises a disk-chucking apparatus that prevents the disk from being separated from the spindle motor when the motor is rotated at a predetermined speed while being rotated along with the disk for assuring safety of the disk rotated in one direction by means of a rotary force of the motor. The chucking performance of the disk-chucking apparatus is a critical aspect of disk drive technology.

Figure 1:
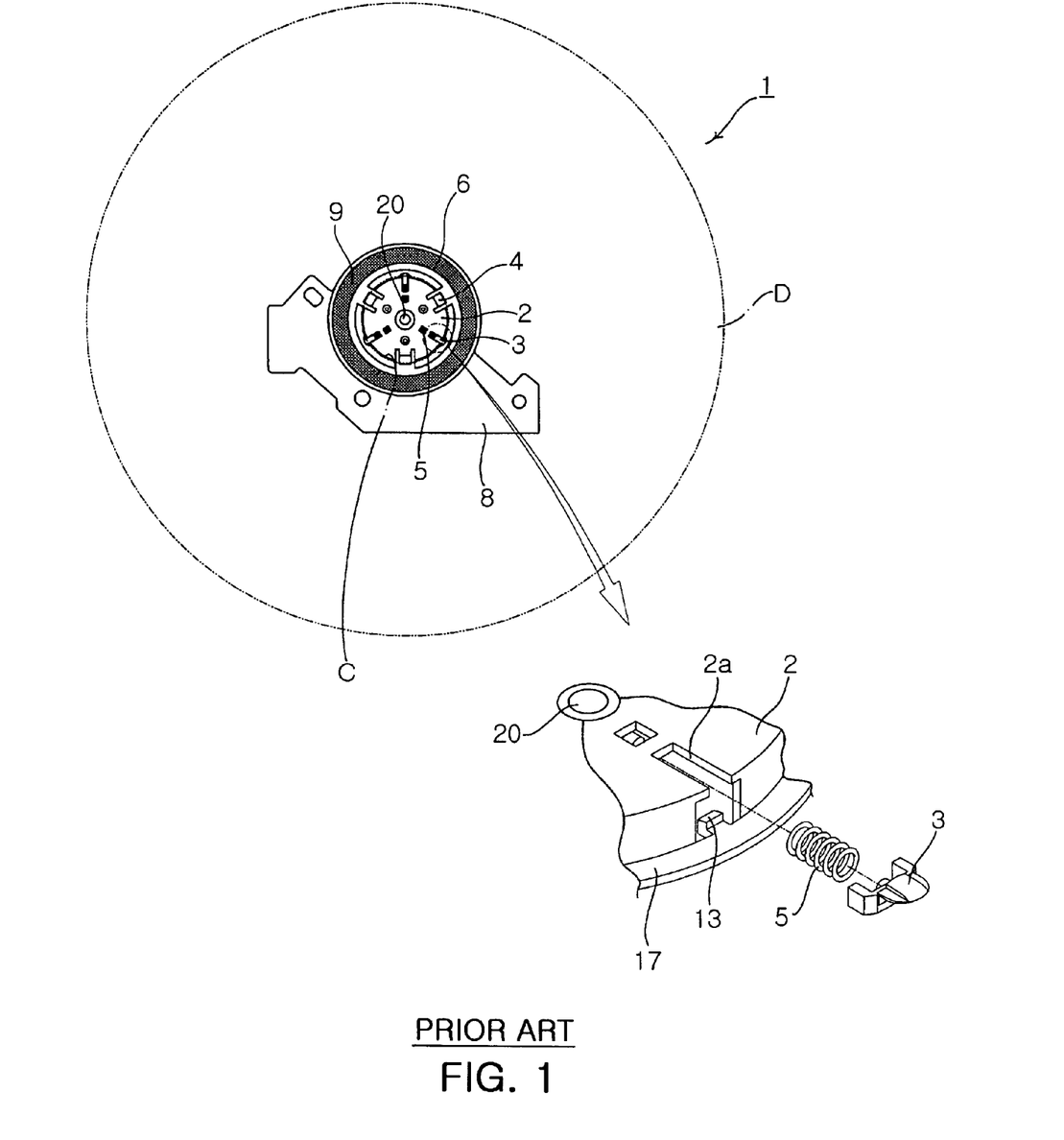
FIG. 1 is a plan view showing a conventional disk-chucking apparatus for disk drives.

FIG. 1 is a plan view showing a conventional disk-chucking apparatus 1 for disk drives. As shown in FIG. 1, the conventional disk-chucking apparatus 1 comprises: a chuck base 2 fixedly mounted to the upper surface of a turntable or a rotary case 9 rotatable by means of a driving force of a motor (not shown) such that a disk D can be fitted on the chuck base 2 through a center hole C of the disk D; a plurality of chuck pins 3 disposed in a plurality of disposition parts 2a formed at the outer surface of the chuck base 2 while being uniformly spaced apart from each other in the circumferential direction of the chuck base 2, respectively, while being movable inward and outward; a plurality of resilient pieces 4 formed at the chuck base 2 between the disposition parts 2a of the chuck base 2 for resiliently supporting the disk D fitted on the chuck base 2 at the inner circumference of the center hole C of the disk D; and a plurality of spring members 5 disposed in the disposition parts 2a of the chuck base 2 for resiliently pushing the chuck pins outward. Unexplained reference numeral 8 indicates a board on which the motor is mounted.

A method for chucking the disk D by means of the conventional disk-chucking apparatus 1 as described above will now be described. When the disk D is pushed downward onto the chuck base 2, the lower edge of the inner circumference of the center hole C of the disk D comes into contact with the chuck pins 3, respectively, since the outer diameter of the chuck base 2 is slightly less than the inner diameter of the center hole C of the disk D while the outer parts of the chuck pins 3 disposed in the disposition parts 2a of the chuck base 2 are slightly protruded outward.

The outer parts of the chuck pins 3 are tapered such that the upper surfaces of the outer parts of the chuck pins 3 are gently inclined downward, respectively. Consequently, the chuck pins 3 are withdrawn inward while compressing the corresponding spring members 5 by means of a fitting force vertically applied to the disk D. At the same time, the resilient pieces 4 are also withdrawn inward.

When the disk D comes into contact with a rubber ring disposed at the upper surface of the rotary case 9, the disk D is maintained while being fitted on the chuck base 2 through the cooperation of the chuck pins 3 pushed outward by a resilient restoring force generated when the spring members 5 are compressed and the resilient pieces 4 having their own resilient restoring forces.

The fitting force required to fit the disk D onto the chuck base 2 of the disk-chucking apparatus 1 is determined depending upon the resilient forces of the spring members 4 that resiliently support the chuck pins 3 outward. The spring members 5 disposed in the respective disposition parts 2a of the chuck base 2 while corresponding to the chuck pins 3, respectively, preferably have the same resilient force. In fact, however, it is difficult to manufacture the spring members 5 such that the spring members 5 have the same resilient force.

When the spring members 5 do not have the same resilient force, and thus when even one of the chuck pins 3 disposed in the disposition parts 2a of the chuck base 2 while being pushed outward by means of the spring members has a relatively large resilient force, the disk D is eccentrically moved toward the chuck pin(s) 3. As a result, the center of the disk D does not exactly correspond to the rotational center of the motor. Specifically, the distance from the center of the disk D to the rotational center of the motor is increased.

When the distance from the center of the disk D to the rotational center of the motor is small, an optical pick-up unit smoothly reads or writes data from or to the disk D with a low error rate. Consequently, decreasing the distance from the center of the disk D to the rotational center of the motor, i.e., aligning the center of the disk D with the rotational center of the motor is very important for the ODD motor.

Figure 2A:
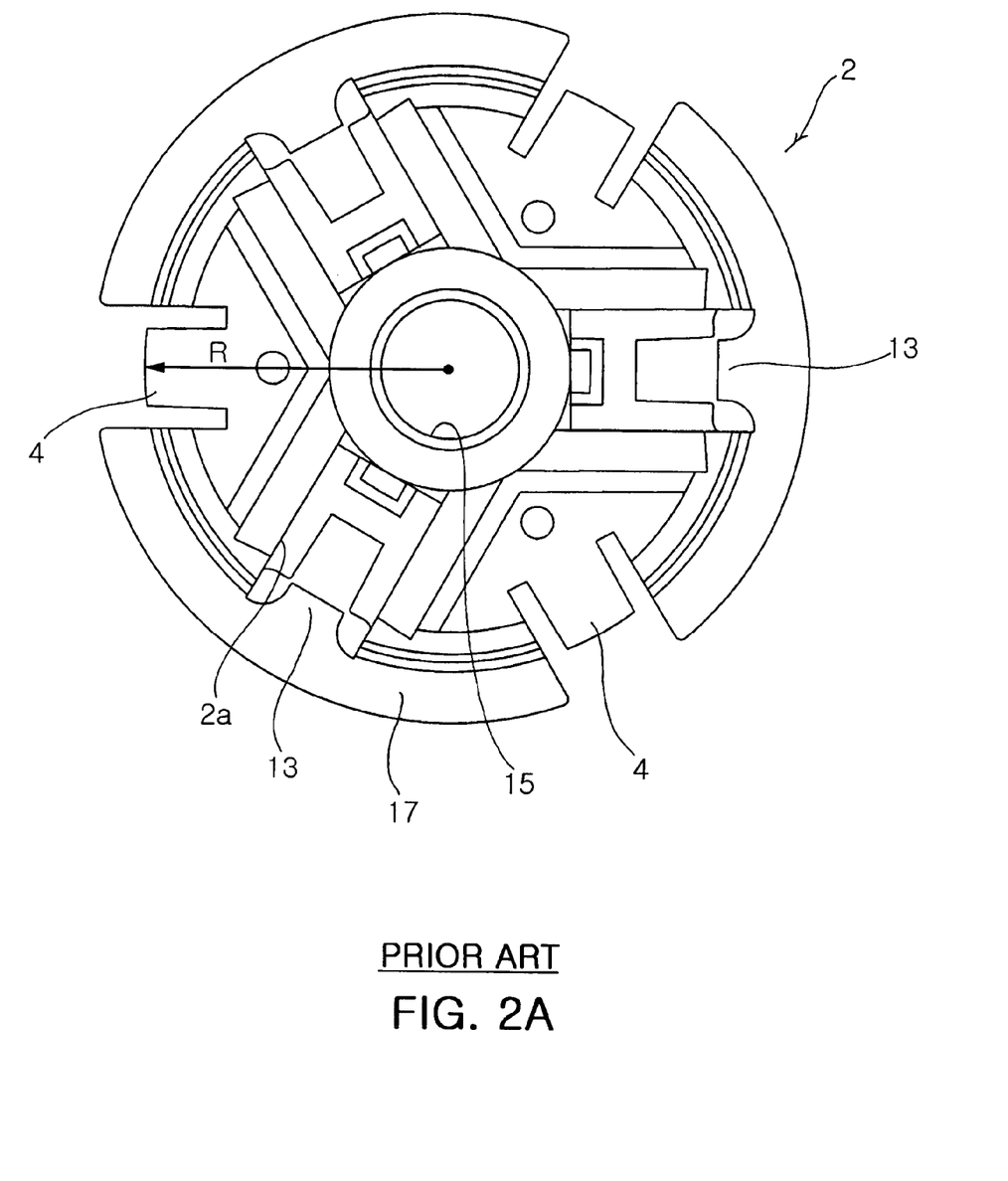
FIG. 2A is a plan view showing a chuck base of the conventional disk-chucking apparatus for disk drives shown in FIG. 1.
Figure 2B:
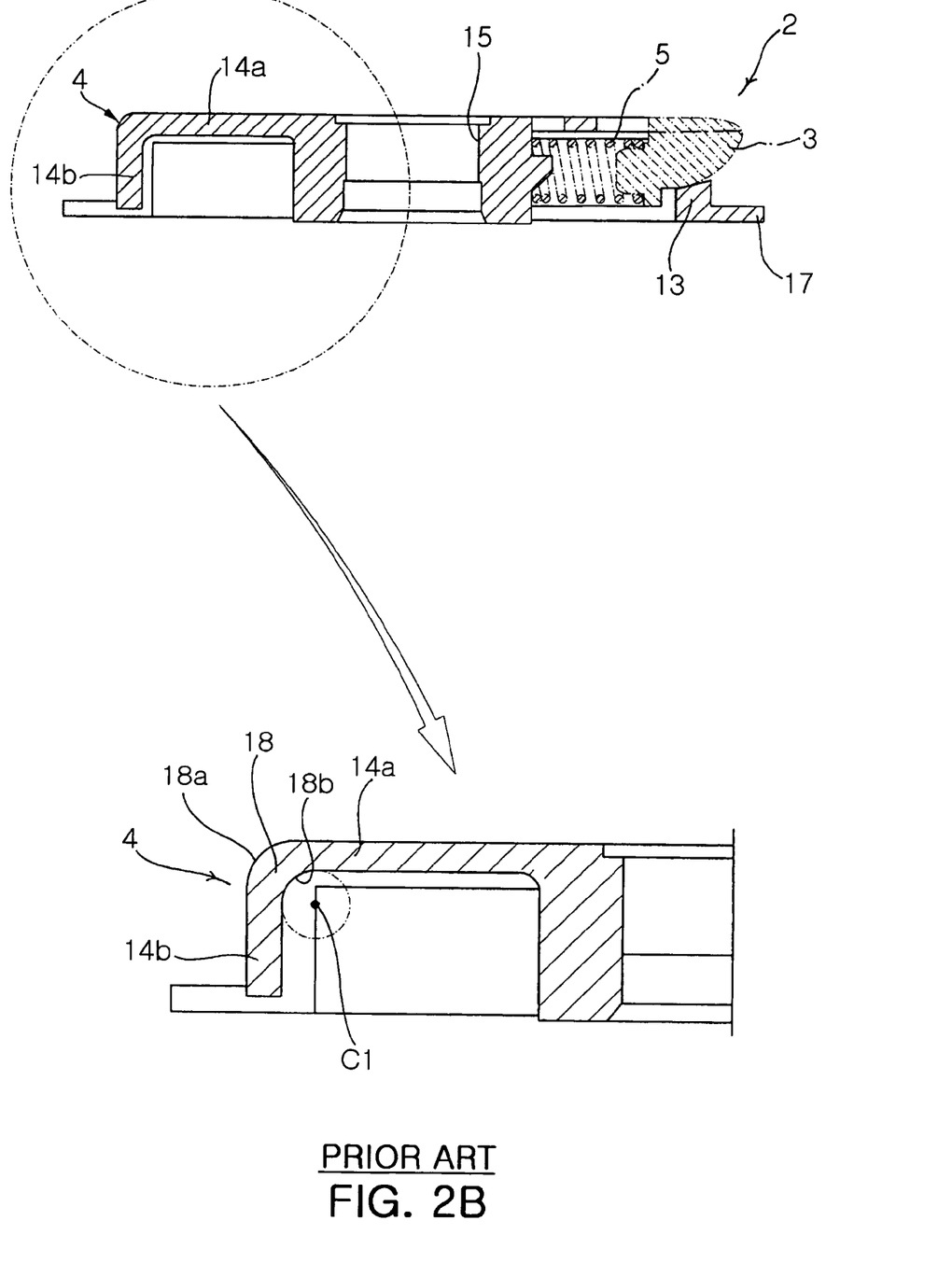
FIG. 2B is a longitudinal sectional view showing the chuck base of the conventional disk-chucking apparatus for disk drives shown in FIG. 1.

FIG. 2A is a plan view showing a chuck base of the conventional disk-chucking apparatus for disk drives shown in FIG. 1, and FIG. 2B is a longitudinal sectional view showing the chuck base of the conventional disk-chucking apparatus for disk drives shown in FIG. 1.

As shown in FIGS. 2A and 2B, the resilient pieces 4 are formed, in large numbers, at the chuck base 2 between the disposition parts 2a of the chuck base 2 where the corresponding chuck pins 3 are disposed for generating resilient forces outward to minimize the distance from the center of the disk D to the rotational center of the motor.

When the resilient forces of the spring members are increased to prevent the disk D from being separated from or slipping off the chuck base 2, and thus the detaching force required to detach the disk D from the chuck base 2 is increased, automatic aligning function of the resilient pieces 4 to align the center of the disk D with the rotational center of the motor may be deteriorated or lost, since the resilient forces generated from the resilient pieces 4 each having a curved part 18 formed, with predetermined outer and inner curvatures 18a and 18b, at the interface between a horizontal resilient part 14a and a vertical resilient part 14b is less than those of the spring members 5. As a result, errors may frequently occur when the pick-up unit reads or writes information from or to the recording surface of the disk D.

When the distance from the center of the disk D to the rotational center of the motor is increased, the moved amount of the pick-up unit is increased, and thus the consumed amount of electric current, necessary to move the pick-up unit, is also increased.

The inner curvature 18b of the curved part 18, which is formed at the inner edge of each of the resilient pieces 4, is equal to or less than the outer curvature 18a of the curved part 18, which is formed at the outer edge of each of the resilient pieces 4. Consequently, the thickness of the vertical resilient part 14b is decreased as the center C1 of the inner curvature 18b approaches each of the resilient pieces 4 with the result that the resilient force of each of the resilient pieces 4 is decreased, and thus the resilient pieces 4 may be easily broken by an external force.

The radius of curvature of each resilient piece 4, the outer surface of which contacts the inner circumference of the center hole C of the disk D, is equal to that of the center hole C of the disk D. Consequently, a large frictional force occurs as the outer surface of each resilient piece 4 comes into contact with the inner circumference of the center hole C of the disk D with the result that it is very difficult to smoothly fit the disk D onto the chuck base 2 or detach the disk D from the chuck base 2.

In order to fit a driving shaft 20 of the motor into a fitting hole 15 formed through the center of the chuck base 2, a bonding agent is applied to the inner circumference of the fitting hole 15 of the chuck base 2 or the outer circumference of the driving shaft 20 of the motor, and then the driving shaft 20 is inserted into the fitting hole 15. As a result, the driving shaft is fixedly attached to the chuck base 2 by means of the bonding agent.

As described above, a bonding agent is applied to the inner circumference of the fitting hole 15 of the chuck base 2 or the outer circumference of the driving shaft 20 of the motor in order to fit the driving shaft 20 of the motor into the fitting hole 15 of the chuck base 2. Consequently, the assembly of the conventional disk-chucking apparatus is complicated and troublesome, and the cost of manufacturing the conventional disk-chucking apparatus is increased.

The bonding force of the bonding agent applied between the fitting hole 15 and the driving shaft 20 is easily decreased due to external temperature variation or external impact. Also, the chuck base 2 is easily separated from the driving shaft 20 of the motor as the disk D is repetitively fitted onto the chuck base 2 and detached from the chuck base 2.

Furthermore, the disk D is eccentrically moved due to the bonding agent applied to the gap between the fitting hole 15 and the driving shaft 20. As a result, the distance from the center of the disk D to the rotational center of the driving shaft 20 is increased, whereby errors frequently occur during reading/writing data from/to the disk D. Also, the moved amount of the pick-up unit is increased.

At the lower edge of the chuck base 2 are formed thin flanges 17, which extend outward. Each of the flanges 17 is provided at the inner side thereof with a pin-supporting member 13 for supporting the lower end of the corresponding chuck pin 3, which is pushed downward when the disk D is fitted onto the chuck base 2.

However, an external vertical downward force, which is generated as the chuck pins 3 come into contact with the pin-supporting members 13 when the disk D is fitted onto the chuck base 2, is focused on connection regions between the pin-supporting members 13 and the flanges 17, by which the connection regions are broken.

SUMMARY OF THE INVENTION

Therefore, the present invention has been made in view of the above problems, and it is an object of the present invention to provide a disk-chucking apparatus for disk drives that is capable of minimizing the distance from the center of the disk to the rotational center of the driving shaft of the motor, which is caused due to deviation of resilient forces of the springs, so as to reduce errors during reading/writing data from/to the disk, and minimizing the frictional resistance between the disk and the resilient pieces, so as to smoothly carry out fitting of the disk onto the chuck base and detaching of the disk from the chuck base.

It is another object of the present invention to provide a disk-chucking apparatus for disk drives wherein the chuck base is securely fitted on the driving shaft of the motor without using the bonding agent, whereby the cost of manufacturing the disk-chucking apparatus is reduced, the assembly efficiency is improved, the chuck base is effectively prevented from being separated from the driving shaft of the motor, and the chuck base is prevented from being damaged or broken.

In accordance with the present invention, the above and other objects can be accomplished by the provision of a disk-chucking apparatus for disk drives that chucks a disk rotated by means of a rotary driving force of a motor, the apparatus comprising: a chuck base having a fitting hole formed through the center thereof for allowing a driving shaft of the motor to be inserted therethrough, a plurality of shaft-pressing protrusions formed at the inner circumference of the fitting hole of the chuck base, and a plurality of first and second disposition parts formed at the outer surface thereof while being spaced apart from each other in the circumferential direction of the chuck base, the disk being fitted onto the chuck base through a center hole of the disk; a plurality of chuck pins disposed in the first disposition parts of the chuck base such that the chuck pins can be moved inward and outward, respectively, the chuck pins being resiliently supported outward by means of spring members each having one end connected to the chuck base; and a plurality of resilient pieces provided at the second disposition parts, respectively, the resilient pieces each comprising a curved part, formed between a horizontal resilient part and a vertical resilient part, having first and second inner curved sections such that outer surfaces of the resilient pieces resiliently contact the inner circumference of the center hole of the disk.

Preferably, the first inner curved section has a radius of curvature greater than that of an outer curved section formed at the outer surface of the curved part, the first inner curved section having a center of curvature located such that the thickness of the curved part is greater than that of the horizontal resilient part and that of the vertical resilient part, and the second inner curved section has a radius of curvature less than that of the first inner curved section, the second inner curved section being formed at the horizontal resilient part where formation of the first inner curved section begins such that the resilient force of each of the resilient pieces is generated at the horizontal resilient part.

Preferably, the resilient pieces each have a radius of curvature less than the radius of the center hole of the disk such that the outer surfaces of the resilient pieces come into linear contact, in the vertical direction thereof, with the inner circumference of the center hole of the disk.

Preferably, the shaft-pressing protrusions are formed at angular points of a regular polygon having sides of the same length and inscribed in the fitting hole of the chuck base.

Preferably, the chuck base is provided with a plurality of chuck pin-supporting members each having an upper surface coming into contact with the corresponding chuck pin when the disk is fitted onto the chuck base, each of the chuck pin-supporting members comprising lateral sides integrally connected to the outer edge of each of the first disposition parts where the chuck pins are disposed, respectively.

Preferably, each of the chuck pin-supporting members further comprises a middle part having a thickness greater than those of the lateral sides of each of the chuck pin-supporting members, the lateral sides being integrally connected to the lower edge of each of the first disposition parts.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be described in detail with reference to the accompanying drawings.

Figure 3:
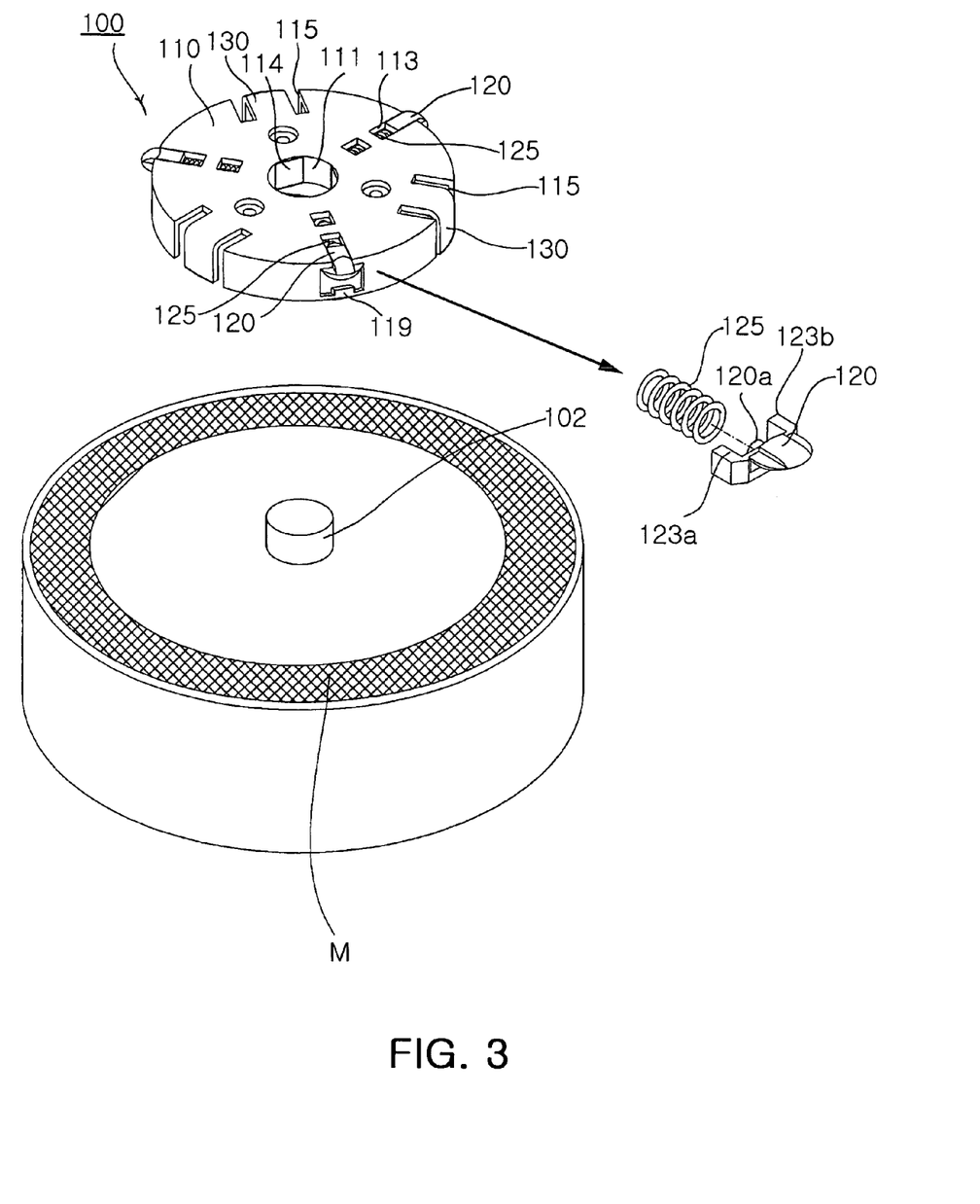
FIG. 3 is a perspective view showing a disk-chucking apparatus for disk drives according to a preferred embodiment of the present invention.
Figure 4A:
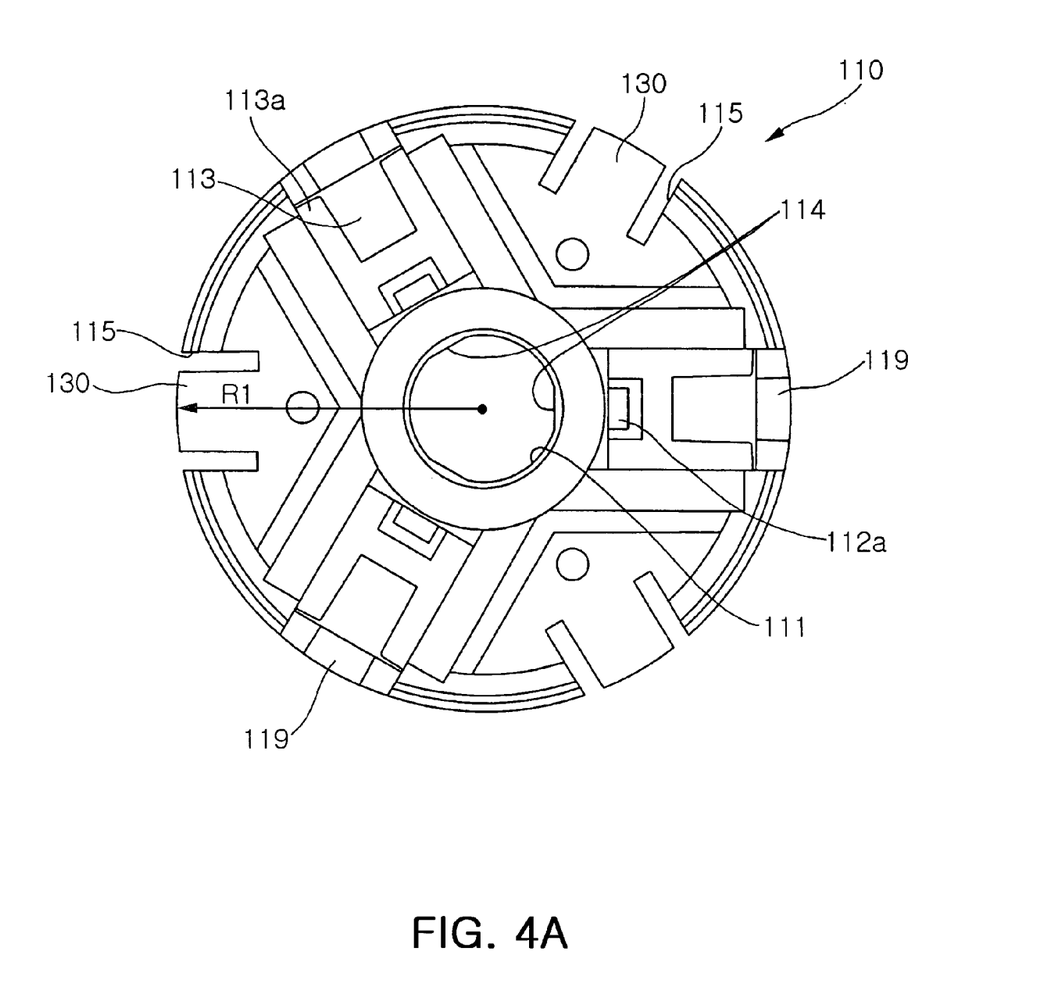
FIG. 4A is a plan view showing the disk-chucking apparatus for disk drives according to the preferred embodiment of the present invention shown in FIG. 3.
Figure 4B:
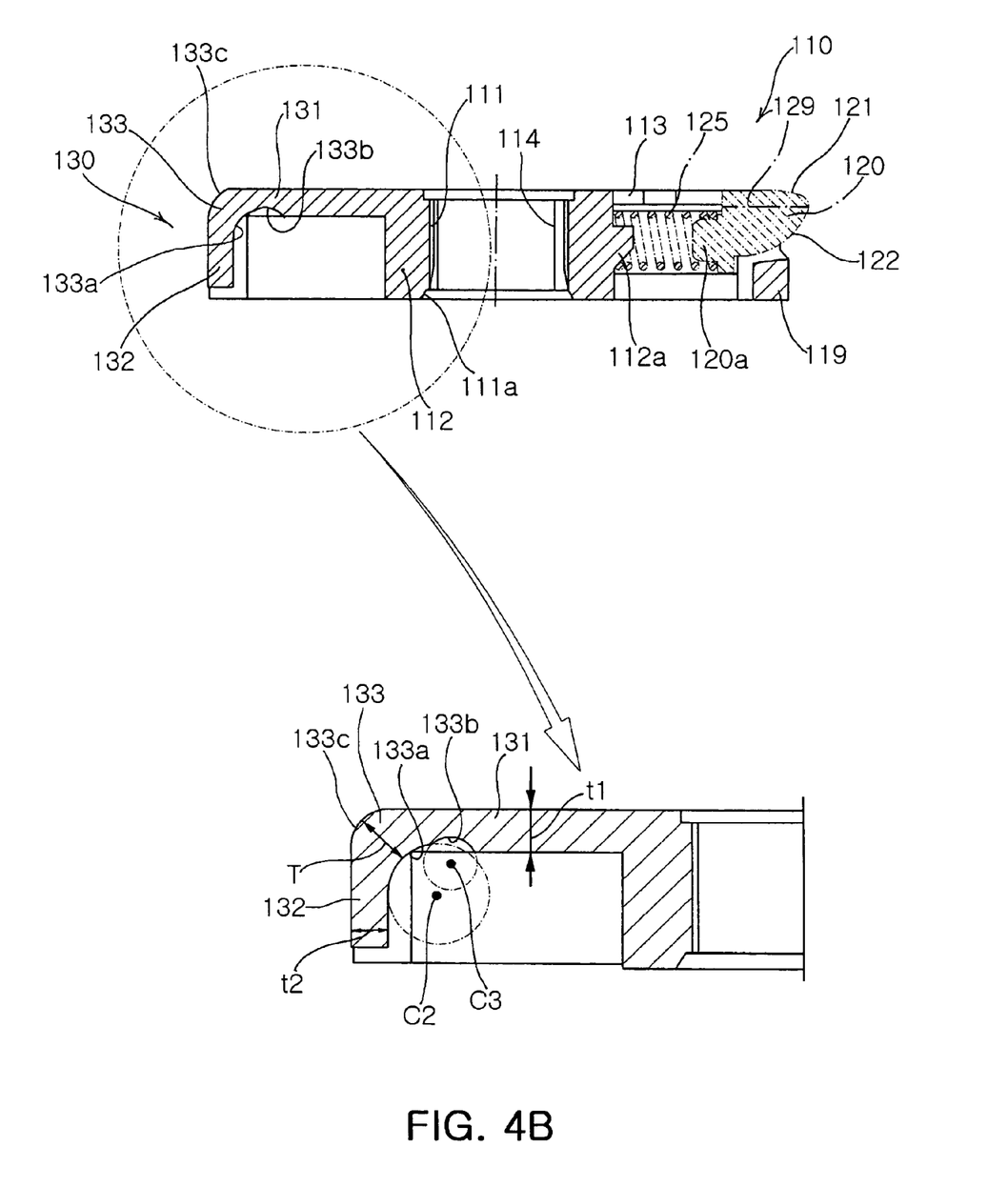
FIG. 4B is a longitudinal sectional view showing the disk-chucking apparatus for disk drives according to the preferred embodiment of the present invention shown in FIG. 3.

FIG. 3 is a perspective view showing a disk-chucking apparatus 100 for disk drives according to a preferred embodiment of the present invention, FIG. 4A is a plan view showing the disk-chucking apparatus 100 for disk drives according to the preferred embodiment of the present invention shown in FIG. 3, and FIG. 4B is a longitudinal sectional view showing the disk-chucking apparatus 100 for disk drives according to the preferred embodiment of the present invention shown in FIG. 3.

With the disk-chucking apparatus 100 according to the present invention as shown in FIGS. 3, 4A and 4B, a disk D is easily attached to or detached from the disk-chucking apparatus 100 while minimizing the distance from the center of a disk D to the rotational center of a motor M in a disk drive that rotates the disk D in one direction by means of the rotary driving force of the motor M. Also, the disk-chucking apparatus 100 according to the present invention is assembled without using a bonding agent, whereby the cost of manufacturing the disk-chucking apparatus 100 is reduced. The disk-chucking apparatus 100 according to the present invention comprises a chuck base 110, chuck pins 120, and resilient pieces 130.

Onto the chuck base 110 is fitted the disk D through a circular center hole of the disk D, which is formed through the center of the disk D. The disk D fitted on the chuck base 110 is also easily detached from the chuck base 110. Through the center of the chuck base 110 is fixedly inserted a driving shaft 102 of the motor M so that the chuck base 110 can be rotated alone or along with the disk D when the motor M is rotated.

The chuck base 110 may be integrally attached to a rotator, which is rotated in one direction relative to a stator when the motor M is rotated. Alternatively, the chuck base 110 may be disposed on an additional turntable attached to the upper surface of the rotator.

When the chuck base 110 is integrally attached to the rotator, the chuck base 110 is provided at the center thereof with a fitting hole 111 having a predetermined size, through which the driving shaft 102 of the motor M is inserted from below.

At the inner circumference of the fitting hole 111 are formed a plurality of shaft-pressing protrusions 114, which press the outer circumference of the driving shaft 102, so that the driving shaft 102 of the motor M is forcibly inserted into the fitting hole 111 of the chuck base 110 with ease and rapidity. Consequently, the chuck base 110 is securely fitted on the driving shaft 102 of the motor M.

Preferably, the shaft-pressing protrusions 114 are formed at angular points of a regular polygon having sides of the same length and inscribed in the fitting hole 111 of the chuck base 110.

The center of the regular polygon imaginarily drawn in the fitting hole 111 corresponds to the center of the fitting hole 111. Also, the center of the fitting hole 111 corresponds to the center of the driving shaft 102 forcibly inserted through the fitting hole 111.

Most preferably, the shaft-pressing protrusions 114 are formed at angular points of a regular triangle inscribed in the fitting hole 111 of the chuck base 110. This is because it is most stable and ideal in structure.

The fitting hole 111 is formed through a cylindrical central boss 112 extending from the upper surface to the lower surface of the chuck base 110. Preferably, the fitting hole 111 has a lower end 111a, the inner diameter of which is gradually increased toward the end of the fitting hole 111 such that the driving shaft 102 can be smoothly inserted into the fitting hole 111 from blow.

The central boss 112 is provided at the outer circumference thereof with latch protrusions 112a, to which corresponding ends of spring members that resiliently push the chuck pins outward are latched.

The chuck base 110 is provided at the outer surface thereof with at least three first disposition parts 113, which are formed in the radial direction of the chuck base 110 while being uniformly spaced apart from each other in the circumferential direction of the chuck base 110. Between the first disposition parts 113 are disposed second disposition parts 115, which are also formed in the radial direction of the chuck base 110 while being uniformly spaced apart from each other.

The first disposition parts 113 of the chuck base 110 have guide rails 113a integrally formed at the first disposition parts 113 for slidably moving the chuck pins 110 inward and outward, respectively. The second disposition parts 115 of the chuck base 110 are formed at the chuck base 110 while being spaced predetermined distances from both sides of the resilient pieces 130 each having one end integrally connected to the chuck base 110.

The chuck pins 120 are disposed in the first disposition parts 113 of the chuck base 110 such that the chuck pins 120 can be moved inward and outward, respectively. When the disk D is fitted onto or detached from the chuck base 110, the chuck pins 120 are guided along the guide rails 113a in the radial direction of the chuck base 110 by means of the vertical downward fitting force or the vertical upward detaching force, which is generated through the contact between the lower or upper edge of the inner circumference of the center hole C of the disk D and the upper or lower surfaces of the chuck pins 120.

The chuck pins 120 each have an upper edge slope part 121 and a lower edge slope part 122. The upper edge slope part 121 is formed at the upper edge of each of the chuck pins 120, which contacts the lower end of the center hole C of the disk D when the disk D is fitted onto the chuck base 110. The upper edge slope part 121 is gradually inclined downward while extending outward. The lower edge slope part 122 is formed at the lower edge of each of the chuck pins 120, which contacts the upper end of the center hole C of the disk D when the disk D is detached from the chuck base 110. The lower edge slope part 122 is abruptly inclined upward while extending outward.

At the upper surface of each of the chuck pins 120 where the slope of the upper edge slope part 121 begins are formed guide grooves 129, which extend in the longitudinal direction of the chuck pins 120 such that the chuck pins 120 can be smoothly moved inward and outward in the first disposition parts 113 of the chuck base 110 through sliding engagement of the guide rails 113a of the first disposition parts 113 with the guide grooves 129.

At the rear part of each of the chuck pins 120 disposed in the first disposition parts 113 of the chuck base 110 such that the chuck pins 120 can be moved inward and outward are formed wing parts 123a and 123b, which extend to both sides of each of the chuck pins 120. The wing parts 123a and 123b are disposed in each of the first disposition parts 113 such that the wing parts 123a and 123b are not separated from each of the first disposition parts 113. Between the wing parts 123a and 123b is formed another latch protrusion 120a, which is inserted in one end of each of the spring members 125, in the other end of which is inserted the latch protrusion 112a of the central boss 112.

The resilient pieces 130, each having an outer surface resiliently contacting the inner circumference of the center hole C of the disk D when the disk D is fitted onto the chuck base 110, are provided at the second disposition parts 115, which are also provided between the first disposition parts 113 formed at the outer surface of the chuck base 110 in the circumferential direction of the chuck base 110, where the chuck pins 120 are disposed. Each of the resilient pieces 130 is formed in the sectional shape of a "¬".

Each of the resilient pieces 130 comprises: a flat horizontal resilient part 131 having the same level as the upper surface of the chuck base 110; a vertical resilient part 132 contacting the inner circumference of the center hole C of the disk D; and a curved part 133 formed between the horizontal resilient part 131 and the vertical resilient part 132. At the inner surface of the curved part 133 are formed first and second inner curved sections 133a and 133b having different radiuses of curvature. At the outer surface of the curved part 133 is formed an outer curved section 133c.

The radius of curvature of the first inner curved section 133a is greater than that of the outer curved section 133c formed at the outer surface of the curved part 133. The center of curvature C2 of the first inner curved section 133a corresponds to the center of an imaginary circle, the outer circumference of which contacts the horizontal resilient part 131 and the vertical resilient part 132 such that the thickness T of the curved part 133 is greater than the thickness t1 of the horizontal resilient part 131 and the thickness t2 of the vertical resilient part 132.

The radius of curvature of the second inner curved section 133b is less than that of the first inner curved section 133a. The second inner curved section 133b is formed at the inner surface of the horizontal resilient part 131 where formation of the first inner curved section 133a begins such that the resilient force of each of the resilient pieces 130 is generated at the horizontal resilient part 131. The center of curvature C3 of the second inner curved section 133b is further biased to the central boss 112 than the center of curvature C2 of the first inner curved sections 133a.

Preferably, the radius of curvature of the first inner curved section 133a is 0.6 to 1.0 mm, and the radius of curvature of the second inner curved section 133b is approximately 70% of the thickness t1 of the horizontal resilient part 131. The thickness T of the curved part 133 is also preferably 0.6 mm or more.

Preferably, each of the resilient pieces 130, which are provided between the chuck pins 120 disposed at the chuck base 110 while being uniformly spaced apart from each other in the circumferential direction of the chuck base 110, has a radius of curvature less than the radius of the center hole C of the disk D such that the outer surface of each of the resilient pieces 130 does not come into planar contact with the inner circumference of the center hole C of the disk D but comes into linear contact, in the vertical direction thereof, with the inner circumference of the center hole C of the disk D.

At the chuck base 100, where the chuck pins 120 and the resilient pieces 130 are provided, are formed chuck pin-supporting members 119, the upper surfaces of which contact the lower edge slope parts 122 formed at the lower surfaces of the chuck pins 120, respectively, when the disk D is fitted onto the chuck base 110. Lateral sides of each of the chuck pin-supporting members 119 are integrally connected to the outer edge of each of the first disposition parts 113 where the chuck pins 120 are disposed, respectively.

An external force transmitted to the chuck pin-supporting members 119, the upper surfaces of which contact the corresponding lower surfaces of the chuck pins 120 when the disk D is fitted onto the chuck base 110, is dispersed at the lateral sides of each of the chuck pin-supporting members 119. Consequently, deformation of or damage to the chuck pin-supporting members 119 is effectively prevented.

Preferably, the upper surfaces of the chuck pin-supporting members 119 are inclined inward such that the chuck pins 120 can be slid while the lower edge slope parts 122 of the chuck pins 120 gently contact the upper surfaces of the chuck pin-supporting members 119, respectively.

The middle part of each of the chuck pin-supporting members 119 preferably has a thickness greater than those of the lateral sides of each of the chuck pin-supporting members 119, which are integrally connected to the lower edge of each of the first disposition parts 113. Since the lateral sides of each of the chuck pin-supporting members 119 are integrally connected to the chuck base 110, the chuck pin-supporting members 119, which contact the chuck pins 120 pressed downward when the disk D is fitted onto the chuck base 110, are prevented from being broken or damaged. At the same time, flexural deformation of the chuck pin-supporting members 119 is minimized, and thus a half disk-chucking phenomenon is prevented.

Now, a procedure of fitting the disk D onto the chuck base 110 using the disk-chucking apparatus 100 with the above-stated construction according to the present invention will be described in detail with reference to FIG. 3. As shown in FIG. 3, the disk D is brought onto the chuck base 110 such that the center hole C of the disk D exactly corresponds to the center of the chuck base 110.

When the disk D is pushed vertically downward such that the disk is fitted onto the chuck base 110, the lower end of the center hole C of the disk D first comes into contact with the upper edge slope parts 121 formed at the upper edges of the chuck pins 120, since the outer parts of the chuck pins 120 disposed in the respective first disposition parts 113 of the chuck base 110 are protruded outward although the outer diameter of the chuck base 110 is less than the inner diameter of the center hole C of the disk D.

By virtue of the fitting force applied to the upper surface of the disk D, the plurality of chuck pins 120 are moved inward along the first disposition parts 113 of the chuck base 110 at the same time. Consequently, the outer parts of the chuck pins 120 are inserted into the chuck base 110, and simultaneously the spring members 125 disposed between the chuck pins 120 and the central boss 112 of the chuck base 110 are compressed with the result that resilient restoring force is generated. The compressed amount of each of the spring members 125 corresponds to the moved amount of each of the chuck pins 120.

At this time, the chuck pins 120 are slid while the lower edge slope parts 122 formed at the lower edges of the chuck pins 120 contact the upper surfaces of the middle parts of the chuck pin-supporting members 119 formed at the outer edges of the first disposition parts 113 of the chuck base 110. As a result, the chuck pins 120 are inserted inward into the first disposition parts 113 of the chuck base 110, respectively.

Subsequently, the outer ends of the chuck pins 120 are protruded above the upper end of the center hole C of the disk D, and then the chuck pins 120 are moved outward such that the chuck pins 120 are returned to their position by virtue of the resilient restoring force of the spring members 125 that resiliently push the corresponding chuck pins 120 outward. As a result, the lower edge slope parts 122 of the chuck pins 120 come into contact with the upper edge of the center hole C of the disk D, and thus the disk D fitted on the chuck base 110 is securely located by virtue of the resilient force of the spring members 125 provided for the chuck pins 120.

The resilient pieces 130, which are provided at the second disposition parts 115 formed between the chuck pins 120 of the chuck base 110, each comprise the horizontal resilient part 131, the vertical resilient part 132, and the curved part 133, formed between the horizontal resilient part 131 and the vertical resilient part 132, having the first and second inner curved sections 133a and 133b, as described above. Also, the radius of curvature of the first inner curved section 133a is greater than that of the outer curved section 133c of the curved part 133, and the center of curvature C3 of the second inner curved section 133b having a radius of curvature less than that of the first inner curved section 133a is further biased to the central boss 112 than the center of curvature C2 of the first inner curved sections 133a. As a result, the resilient force applied in the radial direction by the lower ends of the resilient pieces 130 is increased.

Consequently, the resilient pieces 130 resiliently support the disk D with uniformity in the radial direction as the outer surfaces of the resilient pieces 130 come into contact with the inner circumference of the center hole C of the disk D, whereby the distance from the center of the center hole C of the disk D to the rotational center of the driving shaft 102 of the motor M, which is increased due to different resilient forces of the spring members 130 provided for the corresponding chuck pins 120, is minimized.

Figure 5:
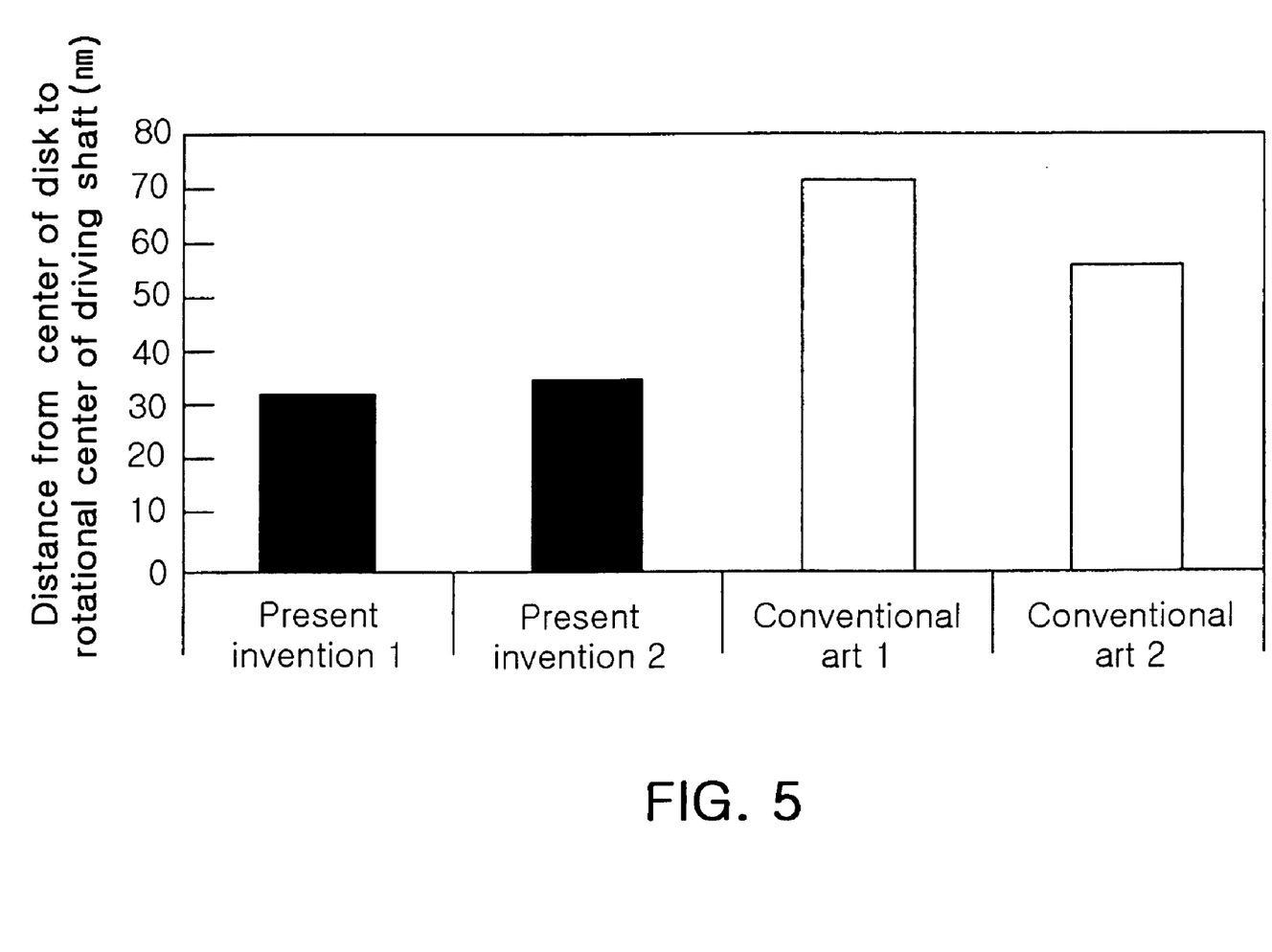
FIG. 5 is a graph illustrating comparison, in the distance from the center of a disk to the rotational center of a driving shaft, between the conventional disk-chucking apparatus and the disk-chucking apparatus according to the preferred embodiment of the present invention.

FIG. 5 is a graph illustrating comparison, in the distance from the center of the disk to the rotational center of the driving shaft, between the conventional disk-chucking apparatus 1 and the disk-chucking apparatus 100 according to the preferred embodiment of the present invention. For the conventional disk-chucking apparatus 1, the distance from the center of the disk D to the rotational center of the driving shaft 20 is 50 to 70 μm. For the disk-chucking apparatus 100 according to the preferred embodiment of the present invention, on the other hand, the distance from the center of the disk D to the rotational center of the driving shaft 102 is 30 to 40 μm. It can be seen from FIG. 5, therefore, that the distance from the center of the disk D to the rotational center of the driving shaft 102 in the disk-chucking apparatus 100 according to the preferred embodiment of the present invention is less than the distance from the center of the disk D to the rotational center of the driving shaft 20 in the conventional disk-chucking apparatus 1.

Consequently, the moved amount of the pick-up unit that reads/writes data from/to the disk D is decreased, the consumed amount of electric current, necessary to move the pick-up unit, is decreased, and occurrence of errors during reading/writing data from/to the disk D is considerably reduced, as compared to the conventional disk-chucking apparatus.

Also, the resilient pieces 130 are each formed in the sectional shape of an arc such that each of the resilient pieces 130 has a radius of curvature less than the radius of the center hole C of the disk D. As a result, the outer surfaces of the resilient pieces 130 come into linear contact, in the vertical direction thereof, with the inner circumference of the center hole C of the disk D when the disk D is fitted onto the chuck base 110.

In this case, the contact friction between the disk D and the resilient pieces 130 generated when the disk D is fitted onto the chuck base 110 or the disk D is detached from the chuck base 110 is decreased as compared to the case where the outer surfaces of the resilient pieces 130 come into planar contact with the inner circumference of the center hole C of the disk D. Consequently, the force necessary to fit the disk onto the chuck base or detach the disk from the chuck base is reduced, and the resilient force is focused on the regions where the outer surfaces of the resilient pieces 130 come into linear contact with the inner circumference of the center hole C of the disk D.

In addition, the plurality of shaft-pressing protrusions 114 are formed at the inner circumference of the fitting hole 111, and the shaft-pressing protrusions 114 are formed at angular points of a regular polygon having sides of the same length, such as a regular triangle, inscribed in the fitting hole 111 of the chuck base 110. Consequently, when the driving shaft 102 of the motor M is forcibly inserted through the fitting hole 111 formed through the center of the chuck base 110, the center of the driving shaft 102 forcibly inserted through the fitting hole 111 exactly corresponds to the center of the fitting hole 111.

As described above, the assembly of the chuck base 110 and the motor M is easily and rapidly carried out without using a bonding agent. Consequently, the cost of manufacturing the disk-chucking apparatus is reduced, and the assembly operation of the disk-chucking apparatus is simplified, thus assembly efficiency is improved. Also, the distance from the center of the disk D to the rotational center of the driving shaft 102 of the motor M is minimized by means of the resilient pieces 130.

As apparent from the above description, the present invention provides a disk-chucking apparatus for disk drives, which comprises a plurality of resilient pieces resiliently contacting the inner circumference of a center hole of a disk, the resilient pieces each comprising a horizontal resilient part, a vertical resilient part, and a curved part, wherein the curved part is provided at the inner surface thereof with first and second inner curved sections having different radiuses of curvature such that the disk can be resiliently supported in the radial direction thereof by means of the resilient force of the resilient pieces. Consequently, the present invention has the effect of minimizing the distance from the center of the disk to the rotational center of a driving shaft of a motor, which is increased due to different resilient forces of spring members provided for corresponding chuck pins. Also, the moved amount of an optical pick-up unit is decreased, and thus the consumed amount of electric current necessary to move an optical pick-up unit is decreased. Moreover, occurrence of errors during reading/writing data from/to the disk is considerably reduced.

Furthermore, the outer surfaces of the resilient pieces come into linear contact with the inner circumference of the center hole of the disk according to the present invention. Consequently, the contact friction between the disk and the resilient pieces is decreased when the disk is fitted onto a chuck base or the disk is detached from the chuck base, and thus the force necessary to fit the disk onto the chuck base or detach the disk from the chuck base is reduced. Also, the resilient force is focused on the regions where the outer surfaces of the resilient pieces come into linear contact with the inner circumference of the center hole of the disk.

In addition, a driving shaft of the motor is forcibly inserted through a fitting hole of the chuck base without using a bonding agent, and thus the assembly of the chuck base and the motor is easily and rapidly carried out. Consequently, the cost of manufacturing the disk-chucking apparatus is reduced, and the assembly operation of the disk-chucking apparatus is simplified, thus assembly efficiency is improved. Also, the distance from the center of the disk to the rotational center of the driving shaft of the motor is minimized.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A disk-chucking apparatus for disk drives that chucks a disk rotated by means of a rotary driving force of a motor, the apparatus comprising:
    a chuck base having a fitting hole formed through the center thereof for allowing a driving shaft of the motor to be inserted therethrough, a plurality of shaft-pressing protrusions formed at the inner circumference of the fitting hole of the chuck base, and a plurality of first and second disposition parts formed at the outer surface thereof while being spaced apart from each other in the circumference direction of the chuck base, the disk being fitted onto the chuck base through a center hole of the disk;
    a plurality of chuck pins disposed in the first disposition parts of the chuck base such that the chuck pins can be moved inward and outward, respectively, the chuck pins being resiliently supported outward by means of spring members each having one end connected to the chuck base; and
    a plurality of resilient pieces provided at the second disposition parts, respectively, the resilient pieces each comprising a curved part, formed between a horizontal resilient part and a vertical resilient part, having first and second inner curved sections such that outer surfaces of the resilient pieces resiliently contact the inner circumference of the center hole of the disk.

2. The apparatus as set forth in claim 1, wherein:
    the first inner curved section has a radius of curvature greater than that of an outer curved section formed at the outer surface of the curved part, the first inner curved section having a center of curvature located such that the thickness of the curved part is greater than that of the horizontal resilient part and that of the vertical resilient part; and
    the second inner curved section has a radius of curvature less than that of the first inner curved section, the second inner curved section being formed at the horizontal resilient part where formation of the first inner curved section begins such that the resilient force of each of the resilient pieces is generated at the horizontal resilient part.

3. The apparatus as set forth in claim 1, wherein the resilient pieces each have a radius of curvature less than the radius of the center hole of the disk such that the outer surfaces of the resilient pieces come into linear contact, in the vertical direction thereof, with the inner circumference of the center hole of the disk.

4. The apparatus as set forth in claim 1, wherein the shaft-pressing protrusions are formed at angular points of a regular polygon having sides of the same length and inscribed in the fitting hole of the chuck base.

5. The apparatus as set forth in claim 1, wherein the chuck base is provided with a plurality of chuck pin-supporting members each having an upper surface coming into contact with the corresponding chuck pin when the disk is fitted onto the chuck base, each of the chuck pin-supporting members comprising lateral sides integrally connected to the outer edge of each of the first disposition parts where the chuck pins are disposed, respectively.

6. The apparatus as set forth in claim 5, wherein each of the chuck pin-supporting members further comprises a middle part having a thickness greater than those of the lateral sides of each of the chuck pin-supporting members, the lateral sides being integrally connected to the lower edge of each of the first disposition parts.

* * * * *